United States Patent
Wu et al.

(10) Patent No.: US 9,100,412 B2
(45) Date of Patent: Aug. 4, 2015

(54) METHOD AND APPARATUS FOR TRANSMITTING MEDIA RESOURCES

(71) Applicant: Huawei Device Co., Ltd., Shenzhen (CN)

(72) Inventors: Huangwei Wu, Shenzhen (CN); Yu Zhu, Shenzhen (CN); Qinliang Zhang, Shenzhen (CN); Ping Fang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 295 days.

(21) Appl. No.: 13/662,042

(22) Filed: Oct. 26, 2012

(65) Prior Publication Data

US 2013/0051390 A1 Feb. 28, 2013

Related U.S. Application Data

(63) Continuation of application No. PCT/CN2011/073248, filed on Apr. 25, 2011.

(30) Foreign Application Priority Data

Apr. 26, 2010 (CN) .......................... 2010 1 0155439

(51) Int. Cl.
*H04L 12/28* (2006.01)
*H04L 29/06* (2006.01)

(52) U.S. Cl.
CPC ........ *H04L 65/1036* (2013.01); *H04L 65/1069* (2013.01)

(58) Field of Classification Search
USPC .................................. 370/235, 252, 401, 466
See application file for complete search history.

(56) References Cited

U.S. PATENT DOCUMENTS

2005/0235334 A1* 10/2005 Togashi et al. ................. 725/117
2005/0267946 A1 12/2005 An et al.
(Continued)

FOREIGN PATENT DOCUMENTS

| CN | 1910852 A | 2/2007 |
|---|---|---|
| CN | 1984060 A | 6/2007 |
| CN | 101136957 A | 3/2008 |
| CN | 101304548 A | 11/2008 |
| CN | 101309237 A | 11/2008 |
| KR | 10-2005-0105797 | 11/2005 |

OTHER PUBLICATIONS

Written Opinion of the International Searching Authority issued in corresponding PCT Patent Application No. PCT/CN2011/073248, mailed Jul. 28, 2011.
(Continued)

*Primary Examiner* — Ricky Ngo
*Assistant Examiner* — Christine Ng
(74) *Attorney, Agent, or Firm* — Brinks Gilson & Lione

(57) ABSTRACT

Embodiments of the present invention provide a method and an apparatus for transmitting media resources. The method includes: obtaining related information of media resources on a media server (101); sending an instruction message including the related information of the media resources to a telephony server, wherein the instruction message instructs the telephony server to perform session negotiation with a communication peer according to the related information of the media resources to establish a first multimedia session (102); obtaining information of a communication interface used by the telephony server to receive the media resources (103); sending an instruction message according to the information of the communication interface, wherein the instruction message instructs the media server to send the media resources to the telephony server, so that the telephony server transmits the media resources to the communication peer through the first multimedia session (104). The present invention is applicable to media resource transmission in a multimedia session.

24 Claims, 12 Drawing Sheets

(56) References Cited

U.S. PATENT DOCUMENTS

| | | | |
|---|---|---|---|
| 2007/0005788 A1* | 1/2007 | Kim et al. .................... | 709/231 |
| 2007/0050826 A1* | 3/2007 | Bowen et al. .................. | 725/87 |
| 2007/0198669 A1 | 8/2007 | Convertino et al. | |
| 2007/0274344 A1 | 11/2007 | Yang | |
| 2007/0280145 A1* | 12/2007 | Ahn et al. .................... | 370/312 |
| 2009/0024717 A1 | 1/2009 | Im | |
| 2009/0083462 A1* | 3/2009 | Song et al. ................... | 710/105 |
| 2009/0175296 A1 | 7/2009 | P et al. | |
| 2009/0248788 A1* | 10/2009 | Hinds et al. .................. | 709/202 |
| 2010/0070876 A1* | 3/2010 | Jain et al. .................... | 715/748 |
| 2010/0306232 A1* | 12/2010 | Heminghous et al. ........ | 707/769 |

OTHER PUBLICATIONS

International Search Report issued in corresponding PCT Patent Application No. PCT/CN2011/073248, mailed Jul. 28, 2011.

UPnP, "Telephony Working Committee Technical Requirements" UPnP Telephony Working Committee, 2009.

Office Action (including partial English Translation) issued in corresponding Chinese Patent Application No. 201010155439.3; mailed May 22, 2013.

Extended European Search Report issued in corresponding European Patent Application No. 11774367.4, mailed Jul. 25, 2013, 11 pages.

* cited by examiner

METHOD AND APPARATUS FOR TRANSMITTING MEDIA RESOURCES

CROSS-REFERENCE TO RELATED APPLICATIONS

This application is a continuation of International Application No. PCT/CN2011/073248, filed on Apr. 25, 2011, which claims priority to Chinese Patent Application No. 201010155439.3, filed on Apr. 26, 2010, both of which are hereby incorporated by reference in their entireties.

FIELD OF THE INVENTION

The present invention relates to the field of communications technologies, and in particular, to a method and an apparatus for transmitting media resources.

BACKGROUND OF THE INVENTION

With the development of the digital home and the wide digitalization of consumer electronics, a home has more and more home network devices such as digital entertainment devices and household appliances. The home network devices are connected in a wired or a wireless manner to form a home network to implement functions such as content sharing or mutual control.

To implement interworking and control of different types of home network devices, more and more home network devices support the UPnP (Universal Plug and Play, universal plug and play) protocol. In a UPnP system, users implement control over the home network devices through a CP (Control Point, control point) in the home network.

A UPnP AV standard defines AV media resource sharing in the home network, where it is defined that an MS (Media Server, media server) is configured to provide AV media resources, an MR (Media Renderer, media renderer) is configured to decode the AV media resources from the MS, and an MP (Media Player, media player) is configured to play the AV media resources from the MS.

With the continuous development of the digital home and communications technologies, users not only expect to implement sharing of AV media resources within the home network, but also expect to add AV media resources to a multimedia call. For example, during a multimedia call with a TS (Telephony Server, telephony server) such as a mobile phone, a user obtains AV media resources from an MS device at home and plays the AV media resources to a communication peer.

To add AV media resources during the multimedia call, an MR device and a service thereof may be embedded in a mobile phone, and in this way, the mobile phone may receive a control command of a CP through a protocol and an interface defined by the UPnP AV standard, and obtain the AV media resources from the MS device.

When implementing the present invention, the inventors find that the prior art at least has the following problem.

To obtain AV media resources from the MS device, the TS needs to be improved to support the UPnP AV standard, and the implementation is complex.

SUMMARY OF THE INVENTION

Embodiments of the present invention provide a method and an apparatus for transmitting media resources, where media resources can be obtained from an MS device without improving a telephony server, and the implementation is simple.

The embodiments of the present invention adopt the following technical solutions.

A method for transmitting media resources, including:
obtaining related information of media resources on a media server;
sending an instruction message including the related information of the media resources to a telephony server, where the instruction message instructs the telephony server to perform session negotiation with a communication peer according to the related information of the media resources to establish a first multimedia session;
obtaining information of a communication interface used by the telephony server to receive the media resources; and
sending an instruction message according to the information of the communication interface, wherein the instruction message instructs the media server to send the media resources to the telephony server, so that the telephony server transmits the media resources to the communication peer through the first multimedia session.

A method for transmitting media resources, including:
receiving a first instruction message from a control point device, where the first instruction message carries related information of media resources on a media server;
performing session negotiation with a communication peer according to the first instruction message to establish a first multimedia session;
obtaining the media resources from the media server; and
transmitting the media resources to the communication peer through the first multimedia session.

A control point device, including:
a first obtaining module, configured to obtain related information of media resources on a media server;
a first instruction module, configured to send an instruction message including the related information of the media resources to a telephony server, wherein the instruction message instructs the telephony server to perform session negotiation with a communication peer according to the related information of the media resources to establish a first multimedia session;
a second obtaining module, configured to obtain information of a communication interface used by the telephony server to receive the media resources; and
a second instruction module, configured to send an instruction message according to the information of the communication interface, wherein the instruction message instructs the media server to send the media resources to the telephony server, so that the telephony server transmits the media resources to the communication peer through the first multimedia session.

A telephony server, including:
a receiving module, configured to receive a first instruction message from a control point device, where the first instruction message carries related information of media resources on a media server;
an establishment module, configured to perform session negotiation with a communication peer according to the first instruction message to establish a first multimedia session;
an obtaining module, configured to obtain the media resources from the media server; and
a transmission module, configured to transmit the media resources to the communication peer through the first multimedia session.

In the method and apparatus for transmitting media resources according to the embodiments of the present invention, the control point device sends, to the telephony server, the instruction message including the related information of the media resources on the media server, wherein the instruction message instructs the telephony server to perform the session negotiation with the communication peer, determines the information of the communication interface used by the telephony server to receive the media resources, sends the instruction message carrying the information of the communication interface to the media server, wherein the instruction message instructs the media server to send the media resources to the telephony server. Compared with the prior art, the control point device is capable of establishing a media session channel between the media server and the telephony server according to the information of the communication interface used by the telephony server to receive the media resources that is obtained from the media server. The telephony server may obtain the media resources from the media server without any improvement, so the implementation is simple.

BRIEF DESCRIPTION OF THE DRAWINGS

To describe the technical solutions according to the embodiments of the present invention or in the prior art more clearly, the accompanying drawings used for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The technical solutions of the present invention are clearly and completely described in the following with reference to the accompanying drawings in the embodiments of the present invention. It is obvious that the embodiments to be described are only a part rather than all of the embodiments of the present invention. All other embodiments obtained by persons skilled in the art based on the embodiments of the present invention without paying any creative efforts shall fall within the protection scope of the present invention.

To make advantages of the technical solutions of the present invention more comprehensible, the present invention is described in detail below with reference to the embodiments in combination with the accompanying drawings.

Embodiment 1

Figure 1:
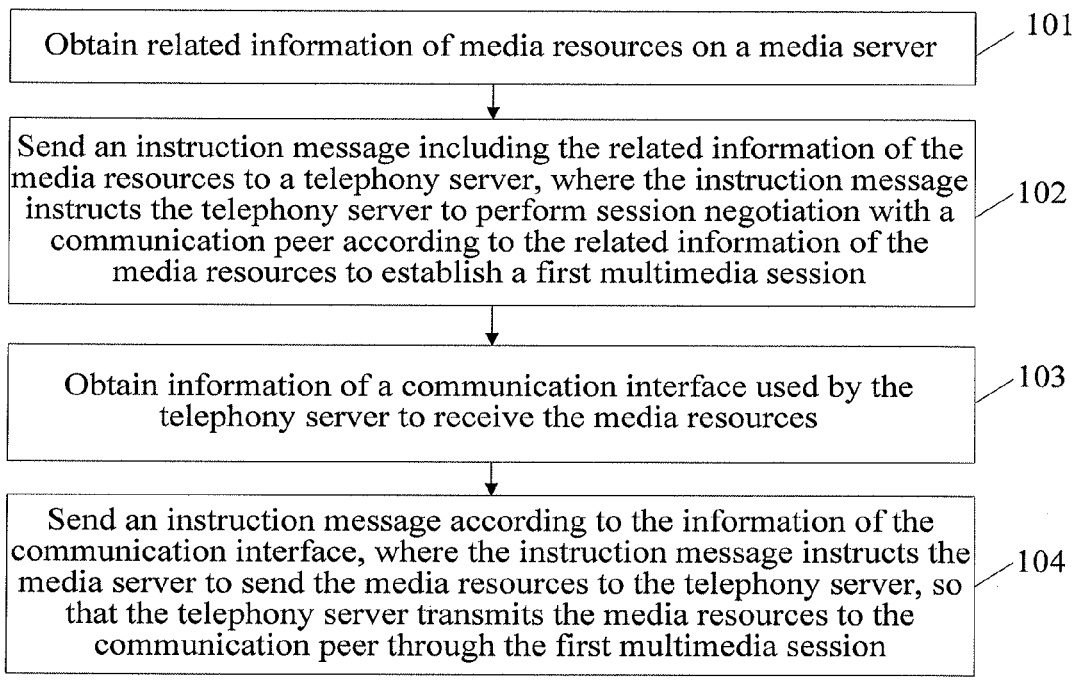
FIG. 1 is a flow chart of a method according to Embodiment 1 of the present invention.

An embodiment provides a method for transmitting media resources. As shown in FIG. 1, the method includes the following steps:

101: Obtain related information of media resources on a media server.

102: Send an instruction message including the related information of the media resources to a telephony server, wherein the instruction message instructs the telephony server to perform session negotiation with a communication peer according to the related information of the media resources to establish a first multimedia session.

103: Obtain information of a communication interface used by the telephony server to receive the media resources.

104: Send an instruction message according to the information of the communication interface, wherein the instruction message instructs the media server to send the media resources to the telephony server, so that the telephony server transmits the media resources to the communication peer through the first multimedia session.

In the method for transmitting media resources according to the embodiment of the present invention, a control point device sends, to a telephony server, an instruction message including related information of media resources on a media server, wherein the instruction message instructs the telephony server to perform session negotiation with a communication peer, determines information of a communication interface used by the telephony server to receive the media resources, sends an instruction message carrying the information of the communication interface to the media server, wherein the instruction message instructs the media server to send the media resources to the telephony server. Compared with the prior art, the embodiment of the present invention establishes a media session channel between the media server and the telephony server according to the information of the communication interface used by the telephony server to receive the media resources that is obtained from the media server. The telephony server may obtain the media resources from the media server without any improvement, so the implementation is simple.

Embodiment 2

Figure 2:
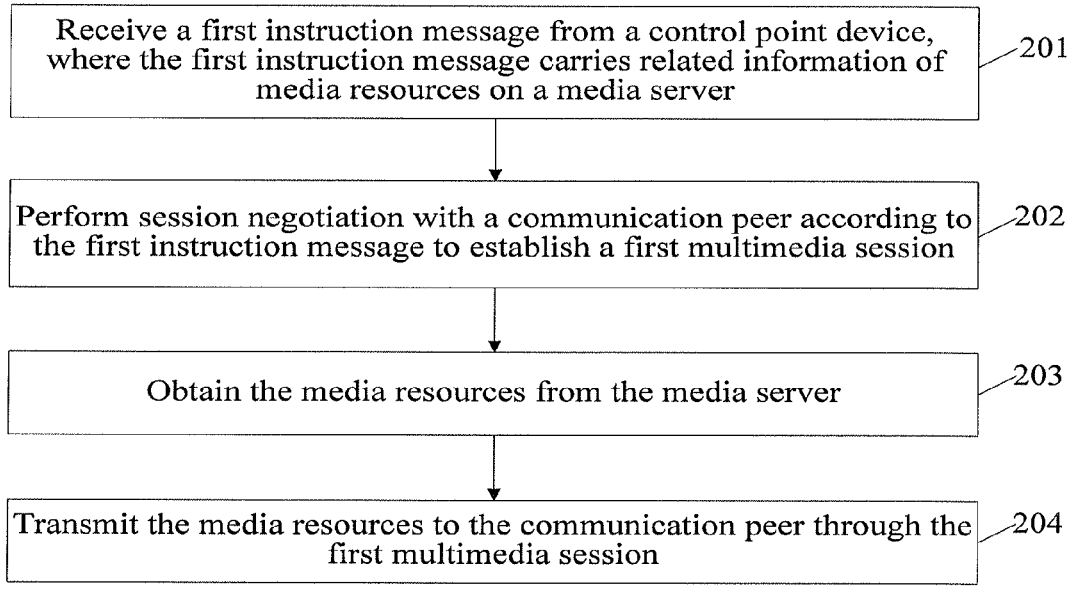
FIG. 2 is a flow chart of a method according to Embodiment 2 of the present invention.

An embodiment provides a method for transmitting media resources. As shown in FIG. 2, the method includes the following steps:

201: Receive a first instruction message from a control point device, where the first instruction message carries related information of media resources on a media server.

202: Perform session negotiation with a communication peer according to the first instruction message to establish a first multimedia session.

203: Obtain the media resources from the media server.

204: Transmit the media resources to the communication peer through the first multimedia session.

In the method for transmitting media resources according to the embodiment of the present invention, a telephony server receives a first instruction message carrying related information of media resources on a media server, performs session negotiation with a communication peer according to the first instruction message to establish a first multimedia session, and transmits the media resources obtained from the media server to the communication peer through the first multimedia session. Compared with the prior art, the telephony server may obtain media resources from the media server without any improvement, and transmit the media resources to the communication peer, so the implementation is simple.

Embodiment 3

An embodiment provides a method for transmitting media resources. In this embodiment, a CP first instructs a TS to perform session negotiation with a WAN (Wide Area Network, wide area network) side communication peer to add media resources, and then establishes media resource transmission between an MS and the TS. The MS transmits media resources to the TS through RTP (Real-time Transport Protocol, real-time transport protocol)/UDP (User Datagram Protocol, user datagram protocol).

In a UPnP AV standard, a protocol combination of RTSP (Real Time Streaming Protocol, real time streaming protocol)/RTP/UDP is supported, that is, an RTSP URI (Universal Resource Identifier, universal resource identifier) is provided to an MR device, and the MR device proactively negotiates with the MS through the RTSP protocol and establishes the media resource transmission based on the RTP/UDP. However, in a UPnP Telephony standard, the CP carries, in a control command, media session parameters in an SDP (Session Description Protocol, session description protocol) format to facilitate the establishment of a media transmission channel between the TS and a TC (Telephony Client, telephony client). Then the TS/TC may directly start transmission of RTP/UDP media resources without interactive signaling such as RTSP and SIP (Session Initiation Protocol, session initiation protocol) signaling.

In this embodiment, the UPnP AV standard is extended, so that the MS can directly and proactively send the RTP/UDP media resources to a destination address/port.

Figure 3:
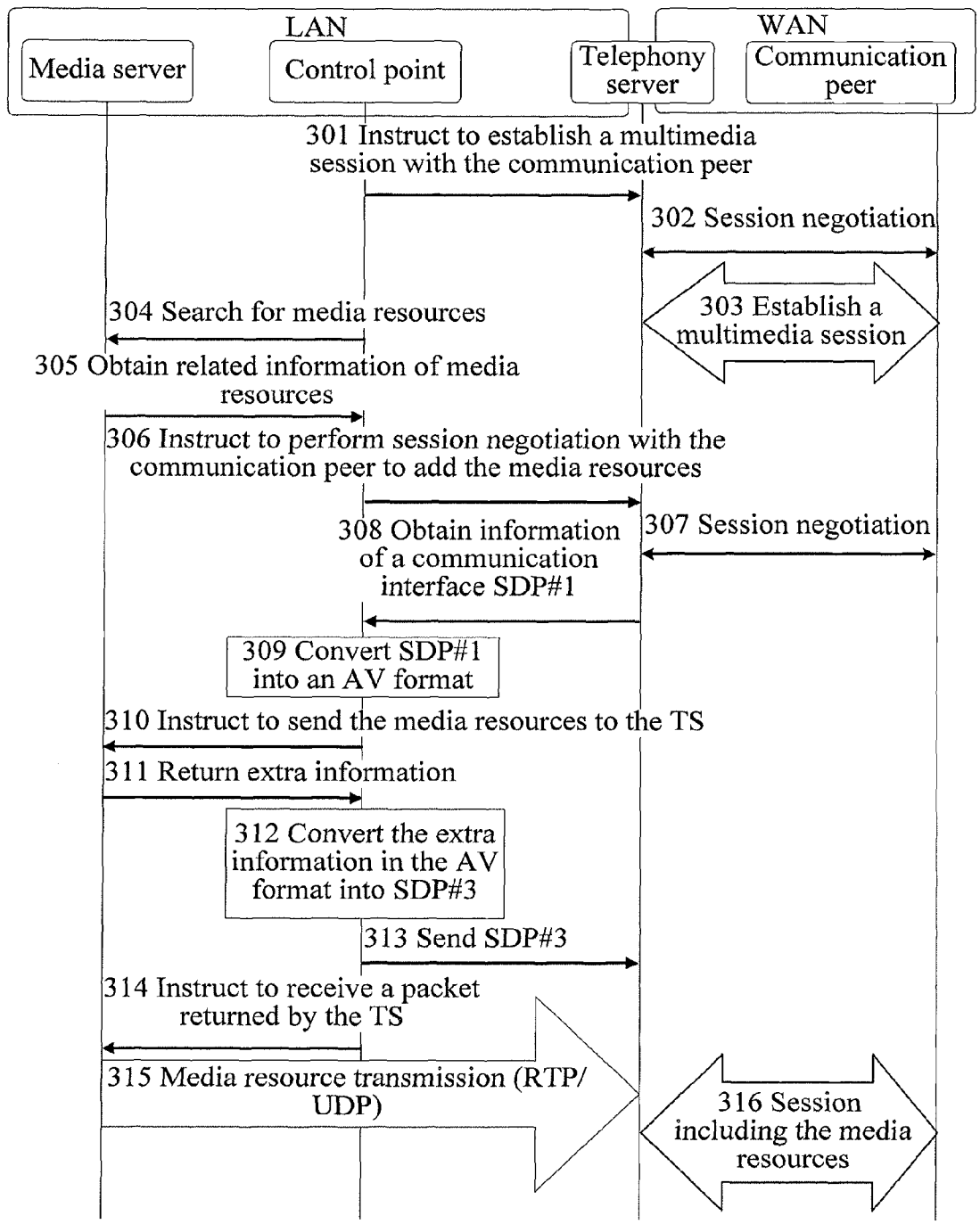
FIG. 3 is a flow chart of a method according to Embodiment 3 of the present invention.

As shown in FIG. 3, the method includes the following steps:

301: A CP instructs a TS to establish a multimedia session with a WAN side communication peer.

302: The TS performs session negotiation with the WAN side communication peer.

303: The TS establishes a multimedia session between the TS and the WAN side communication peer.

304: The CP searches an MS for media resources required by a user according to a requirement of the user.

305: The CP obtains related information of the media resources, where the related information may include: storage address information, transport protocol information, a media encoding format, and a size.

Alternatively, steps 304-305 may also be performed before steps 301-303. That is, the CP first searches the MS for media resources according to a request of the TS, and instructs the TS to establish a multimedia session with the WAN side communication peer.

306: The CP sends an instruction message to the TS and instructs the TS to perform session negotiation with the WAN side communication peer to add the media resources, where the instruction message includes the related information of the media resources.

Alternatively, before step 306, the CP may further obtain capabilities of media resources supported by the TS, so as to determine that the TS can support the media encoding format and transport protocol of the media resources, and so on.

307: The TS performs session negotiation with the WAN side communication peer, to determine media session parameters of the media resources added in the multimedia session. Further, the TS determines information of a communication interface SDP#1 required for receiving the media resources from the MS, where the information of the communication interface SDP#1 includes an address/port and an encoding format used by the TS to receive the media resources.

308: The CP obtains the information of the communication interface SDP#1 from the TS.

Specifically, the CP may obtain the information of the communication interface SDP#1 from the TS in the following two manners: 1. the CP receives a unicast or multicast event message sent by the TS, and the event message carries SDP#1; 2. the CP sends, to the TS, a command message for obtaining a communication interface message, and the TS returns a response message to the CP, where the response message carries SDP#1.

309: The CP converts the information of the communication interface SDP#1 into a format supported by the MS, namely, a format supported by the UPnP AV protocol, that is, converts parameters in SDP#1 into parameters in AVTransportParameters.

310: The CP invokes a SetAVTransportParam( ) control command to the MS, where the control command carries the converted information of a communication interface SDP#1, and instructs the MS to send the previously determined media resources to the address/port specified in the control command through RTP/UDP protocol to send the media resources to the TS.

SetAVTransportParam( ) is an additional control command in the UPnP AV standard, and parameters of the control command are shown in the following table:

| Parameter | Direction | Related state variable |
| --- | --- | --- |
| CurrentParameters | Input | AVTransportParameters |
| SourceParamters | Output | AVTransportParameters |

CurrentParameters are mandatory input parameters, and are used to designate, to the MS, the information of a media transmission session to be established, including information of media resources to be transmitted and information of a receiving end of the media resources. hjCurrentParameters correspond to the AVTransportParamets state variable.

SourceParameters are optional output parameters, and are used for returning some additional information to the CP, including information of a port for receiving an RTCP (RTP Control Protocol, real time transport control protocol) packet in a future session. The same state variable template may be used to describe information returned by the MS. Certainly, different state variables may be defined in practice.

Through the extension of the UPnP AV standard, the MS may receive a command of the CP and directly send RTP media resources to a destination address/port, therefore, the UPnP AV standard is compatible with the Telephony standard. However, the CP still needs to convert the media parameters in the SDP format from the TS into the input parameters in AV action and then send them to the MS, and convert the parameter in an action response from the MS into parameters in the SDP format and then send them to the TS.

311: The MS returns additional information to the CP, including an address/port used by the MS to receive an RTCP packet fed back by the TS.

312: The CP converts the additional information returned by the MS to the information SDP#2 in a format supported by the TS, where SDP#2 is the address/port for receiving the RTCP packet.

313: The CP sends SDP#2 to the TS.

314: The CP sends an instruction message to the MS and instructs the MS to receive a message packet fed back by the TS.

Steps 311-314 may be skipped.

After step 314, the method further includes that: the MS receives, according to the instruction message sent by the CP, the message packet fed back by the TS.

315: Media resource transmission based on the RTP/UDP is started between the MS and the TS, and the media resources are transmitted from the MS to the TS.

316: The TS sends the received media resources to the WAN side communication peer through the established multimedia session.

In the method for transmitting media resources according to the embodiment of the present invention, a CP searches an MS for media resources according to a requirement of a TS, sends an instruction message carrying related information of the media resources to the TS, instructs the TS to perform session negotiation with a communication peer, determines information of a communication interface used by the TS to receive the media resources, sends an instruction message carrying the information of the communication interface to the MS, and instructs the MS to send the media resources to the TS. Compared with the prior art, through the extension of the UPnP AV standard, and protocol comprehension and format conversion of transmission parameters between the TS and MS, a media session channel is established between the MS and the TS, so that the MS can support direct sending of the RTP/UDP media resources to the TS. The TS may obtain the media resources from the MS without any improvement, and send the media resources to the communication peer, so the implementation is simple.

Embodiment 4

An embodiment provides a method for transmitting media resources. In this embodiment, a CP first instructs a TS to perform session negotiation with a WAN side communication peer to add media resources, and then establishes media resource transmission between an MS and the TS. The MS transmits media resources to the TS through RTP/UDP.

Different from Embodiment 3, in this embodiment, media resource transmission based on the RTP/UDP does not need to be established between the TS and MS by using the RTSP signaling. Instead, the TS is required to support the RTSP and establish an RTSP session between the TS and the MS to negotiate actual media resource transmission based on the RTP/UDP.

Figure 4:
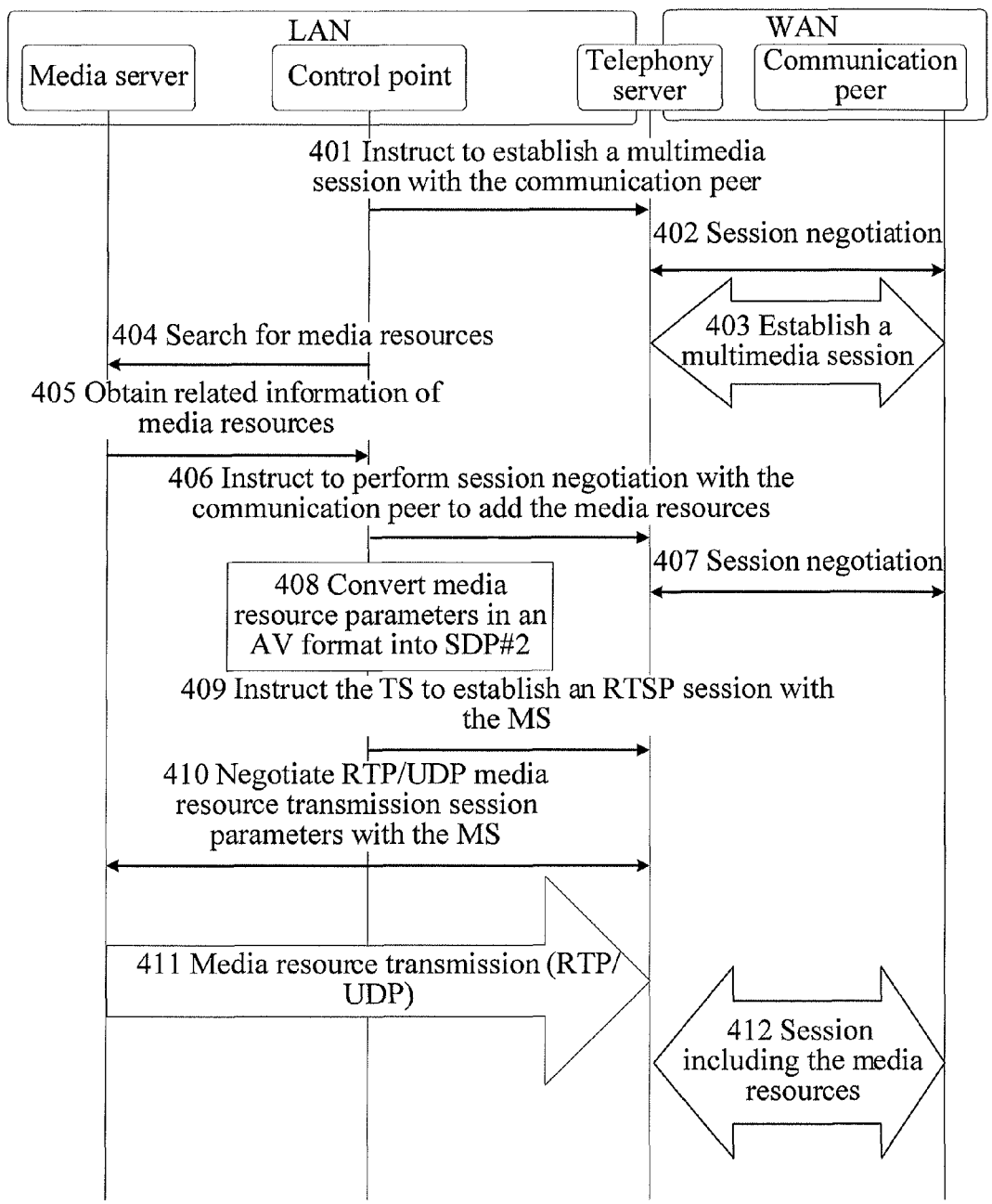
FIG. 4 is a flow chart of a method according to Embodiment 4 of the present invention.

As shown in FIG. 4, the method includes the following steps:

Steps 401-407 are the same as steps 301-307, which are not described in detail herein again.

408: The CP converts the media resource parameters in the AV format obtained in step 405 into SDP#2 which includes an RTSP URL (Uniform Resource Locator, uniform resource locator) for identifying media resources.

409: The CP invokes a StartMediaTransfer( ) control command to the TS, where the control command carries SDP#2, requiring the TS to establish an RTSP session with the MS.

Alternatively, the RTSP URL may be directly sent to the TS in step 406, and in this case, steps 408-409 may be skipped.

410: The TS sends, to the MS, an RTSP SETUP command which requires the establishment of an RTSP session, and negotiates, via the session, RTP/UDP session parameters of actual media resource transmission.

411: Media resource transmission based on the RTP/UDP is started between the MS and TS, and the media resources are transmitted from the MS to the TS.

412: The TS sends the received media resources to the WAN side communication peer through the established multimedia session.

In the method for transmitting media resources according to the embodiment of the present invention, a CP searches an MS for media resources according to a requirement of a TS, sends an instruction message carrying related information of the media resources to the TS, instructs the TS to perform session negotiation with a communication peer, determines information of a communication interface used by the TS to receive the media resources, and instructs the TS to establish a media resource transmission channel with the MS. The MS sends the media resources to the TS through the channel. Compared with the prior art, the TS only needs to support the RTSP and establishes an RTSP session between the TS and the MS to negotiate media resource transmission based on the RTP/UDP, so that the MS can support direct sending of RTP/UDP media resources to the TS. The TS may obtain media resources from the MS without any improvement, and send the media resources to the communication peer, so that the implementation is simple.

Embodiment 5

An embodiment provides a method for transmitting media resources. In this embodiment, a CP first instructs a TS to perform session negotiation with a WAN side communication peer to add media resources, and then establishes media resource transmission between an MS and the TS. The MS transmits media resources to the TS through the HTTP/TCP.

A UPnP AV standard supports media resource transmission through the HTTP protocol. That is, a URI for obtaining media resources is provided to an MR, and the MR uses an HTTP GET message to start transmitting the media resources from the MS to the MR. In addition, the UPnP AV standard also supports that the MS proactively "pushes" the media resources to other devices by using the HTTP POST or PUT, so as to send the media resources from a SourceURI (source URI) to a DestinationURI (destination URI). In this embodiment, the CP needs to accomplish the conversion between the SourceURI/DestinationURI and an SDP format.

Figure 5:
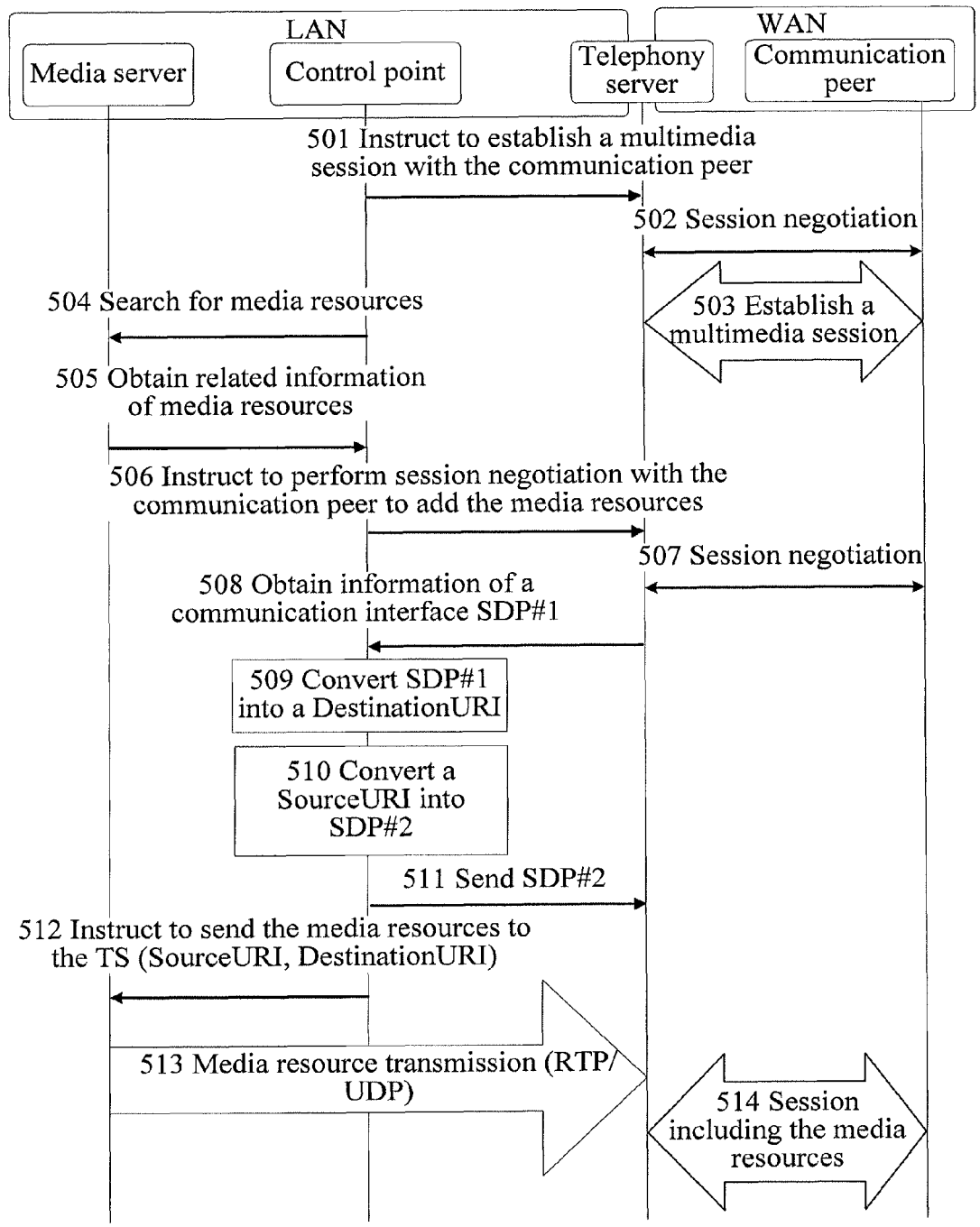
FIG. 5 is a flow chart of a method according to Embodiment 5 of the present invention.

As shown in FIG. 5, the method includes the following steps:

Steps 501-508 are the same as steps 301-308, which are not described in detail herein again.

509: The CP converts the information of the communication interface SDP#1 into a DestinationURI.

510: The CP converts a SourceURI into SDP#2.

The SourceURI is included in the related information of the media resources obtained in step 505.

511: The CP sends SDP#2 to the TS, to confirm that the TS is prepared to start receiving the media resources.

Alternatively, the TS does not need to learn address information of a sender, but only needs to learn reserved resources and wait for an HTTP POST (or PUT) message on a designated port. Therefore, steps 510-511 may be skipped.

512: The CP invokes an ExportResourse (SourceURI, DestinationURL) control command to the MS, where the control command carries a value of the converted SDP#1, and instructs the MS to proactively send, through the HTTP/TCP protocol, media resources determined by the SourceURI to an address/port on the TS specified by the DestiantionURL.

513: Media resource transmission based on the HTTP/TCP is started between the MS and TS, and the media resources are transmitted from the MS to the TS.

514: The TS sends the received media resources to the WAN side communication peer through the established multimedia session.

In the method for transmitting media resources according to the embodiment of the present invention, a CP searches an MS for media resources according to a requirement of a TS, sends an instruction message carrying related information of the media resources to the TS, instructs the TS to perform session negotiation with a communication peer, determines information of a communication interface used by the TS to receive the media resources, sends an instruction message carrying the information of the communication interface to the MS, and instructs the MS to send the media resources to the TS. Compared with the prior art, through the extension of the UPnP AV standard, and protocol comprehension and format conversion of transmission parameters between the TS and MS, a media session channel is established between the MS and the TS, so that the MS can support direct sending of the HTTP/TCP media resources to the TS. The TS may obtain the media resources from the MS without any improvement, and send the media resources to the communication peer, so that the implementation is simple.

Embodiment 6

An embodiment provides a method for transmitting media resources. In this embodiment, a CP first instructs a TS to perform session negotiation with a WAN side communication peer to add media resources, and then establishes media resource transmission between an MS and the TS. The MS transmits media resources to the TS through the HTTP/TCP.

Different from Embodiment 5, in this embodiment, the CP does not perform conversion between an URI and an SDP. Instead, the support for the URI is added to the TS, that is, the TS provides (or the CP designates) a DestinationURL for receiving media resources.

Figure 6:
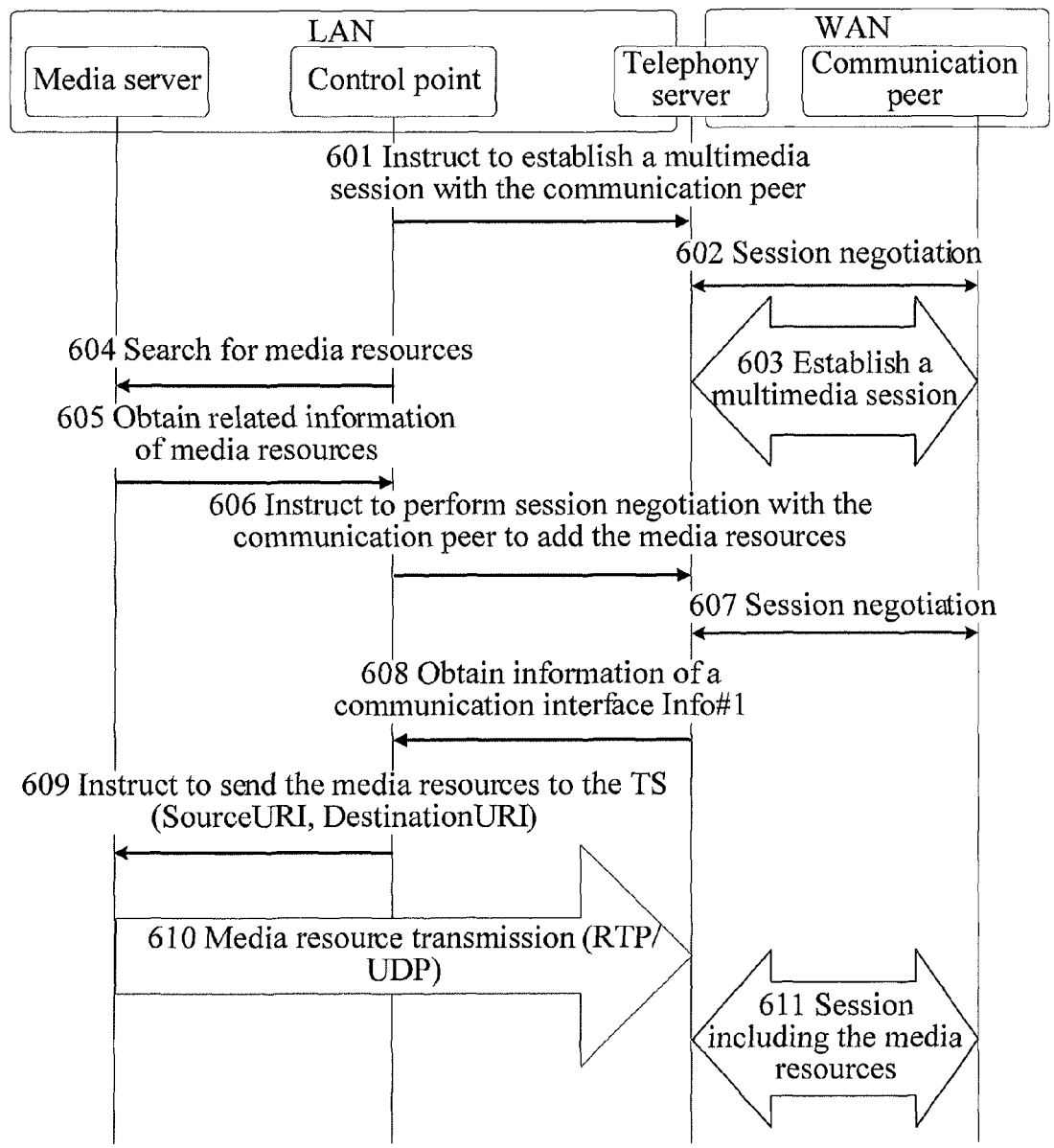
FIG. 6 is a flow chart of a method according to Embodiment 6 of the present invention.

As shown in FIG. 6, the method includes the following steps:

Steps 601-606 are the same as steps 501-506, which are not described in detail herein again.

607: The TS performs session negotiation with the WAN side communication peer to determine media session parameters of the media resources added in the multimedia session. Further, the TS determines information of a communication interface Info#1 required for receiving the media resources from the MS, where the information of the communication interface Info#1 includes the DestinationURL allocated by the TS for receiving the media resources.

Alternatively, the DestiantionURL may be designated by the CP to the TS.

608: The CP obtains the information of the communication interface Info#1 from the TS.

Specifically, the CP may obtain the information of the communication interface Info#1 from the TS in the following two manners: 1. the CP receives a unicast or multicast event message sent by the TS, and the event message carries Info#1; 2. the CP sends a command message for obtaining the communication interface message to the TS, and the TS returns a response message to the CP, where the response message carries Info#1.

609: The CP sends, to the MS, the DestinationURL and a SourceURL required for transmitting the media resources.

The SourceURI is included in the related information of the media resources obtained in step 505.

610: Media resource transmission based on the HTTP/TCP is started between the MS and TS, and the media resources are transmitted from the MS to the TS.

611: The TS sends the received media resources to the WAN side communication peer through the established multimedia session.

In the method for transmitting media resources according to the embodiment of the present invention, a CP searches an MS for media resources according to a requirement of a TS, sends an instruction message carrying related information of the media resources to the TS, instructs the TS to perform session negotiation with a communication peer, determines information of a communication interface used by the TS to receive the media resources, sends an instruction message carrying the information of the communication interface to the MS, and instructs the MS to send the media resources to the TS. Compared with the prior art, through the extension of the UPnP AV standard, and protocol comprehension and format conversion of transmission parameters between the TS and MS, a media session channel is established between the MS and the TS, so that the MS can support direct sending of the HTTP/TCP media resources to the TS. The TS may obtain media resources from the MS without any improvement, and send the media resources to the communication peer, so that the implementation is simple.

Embodiment 7

An embodiment provides a method for transmitting media resources. In this embodiment, a TC device is added, and a user answers a call between a TS (such as a mobile phone) and a WAN side communication peer on the TC device (such as a television). To play, on the TC, media resources from the MS that are sent to the WAN side communication peer, the CP instructs the TS to send the media resources received from the MS to the TC and the WAN side communication peer at the same time.

Figure 7:
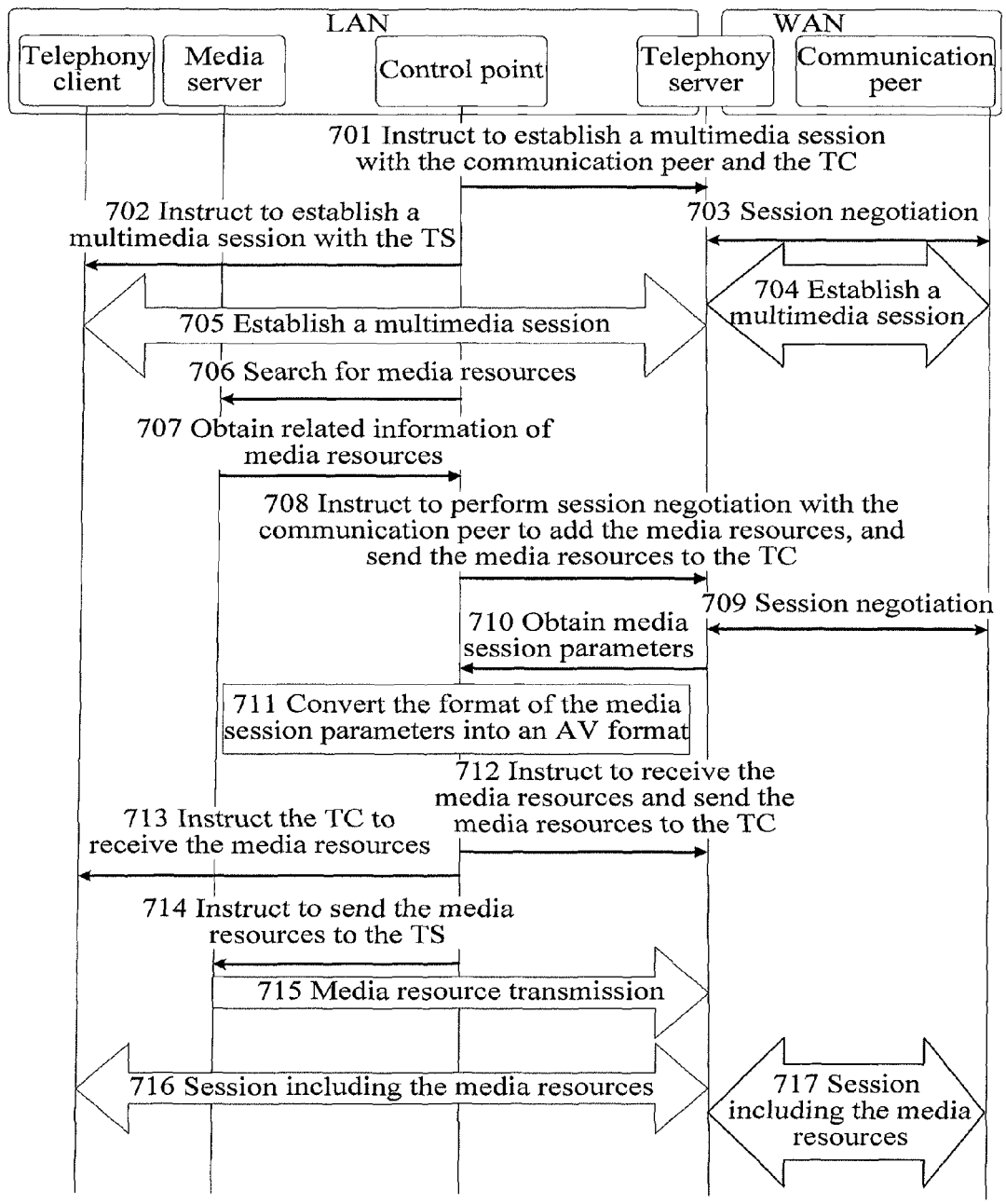
FIG. 7 is a flow chart of a method according to Embodiment 7 of the present invention.

As shown in FIG. 7, the method includes the following steps:

701: A CP instructs a TS to establish a multimedia session with a WAN side communication side and establish a multimedia session between the TS and a TC.

702: The CP instructs the TC to establish a multimedia session between the TC and the TS.

703: The TS performs session negotiation with the WAN side communication peer.

704: The TS establishes a multimedia session between the TS and the WAN side communication peer.

705: The TS establishes a multimedia session between the TS and the TC.

706: The CP searches an MS for media resources required by a user according to a requirement of the user.

707: The CP obtains related information of the media resources.

708: The CP sends an instruction message to the TS and instructs the TS to perform session negotiation with the WAN side communication peer to add the media resources, where the instruction message includes the related information of the media resources and instructs the TS to send the media resources to the TC.

709: The TS performs session negotiation with the WAN side communication peer, and determines media session parameters of the media resources added in the multimedia session.

710: The CP obtains the media session parameters from the TS.

711: The CP converts the format of media session parameters into a format of AV parameters.

712: The CP instructs the TS to prepare to receive media resources and send the received media resources to the TC.

713: The CP instructs the TC to prepare to receive media resources.

714: The CP instructs the MS to send selected media resources to the TS according to the media session parameters.

715: The MS sends the media resources to the TS.

716: The TS sends the media resources to the TC through the multimedia session between the TS and the TC.

717: The TS sends the media resources to the WAN side communication peer through the multimedia session between the TS and the WAN side communication peer.

In the method for transmitting media resources according to the embodiment of the present invention, a CP searches an MS for media resources according to a requirement of a TS, sends an instruction message carrying related information of the media resources to the TS, instructs the TS to perform session negotiation with a communication peer and the TC, determines information of a communication interface used by the TS to receive the media resources, sends an instruction message carrying the information of the communication interface to the MS, instructs the MS to send the media resources to the TS, and instructs the TS to send the received media resources to the TC. Compared with the prior art, through the extension of the UPnP AV standard, and protocol comprehension and format conversion of transmission parameters between the TS and MS, a media session channel is established between the MS and TS, so that the MS can support direct sending of the RTP/UDP media resources to the TS. The TS may obtain the media resources from the MS without any improvement, and send the media resources to the communication peer and the TC, so that the implementation is simple.

Embodiment 8

An embodiment provides a method for transmitting media resources. In this embodiment, a TC device is added, and a user answers a call between a TS (such as a mobile phone) and a WAN side communication peer on the TC device (such as a television). Different from the Embodiment 7, to play, on the TC, media resources from an MS sent to the WAN side communication peer, a CP controls media resources in the MS to be sent to the TC and the TS at the same time, that is, the CP establishes a media resource transmission session between the MS and TS, and a media resource transmission session between the MS and TC.

Figure 8:
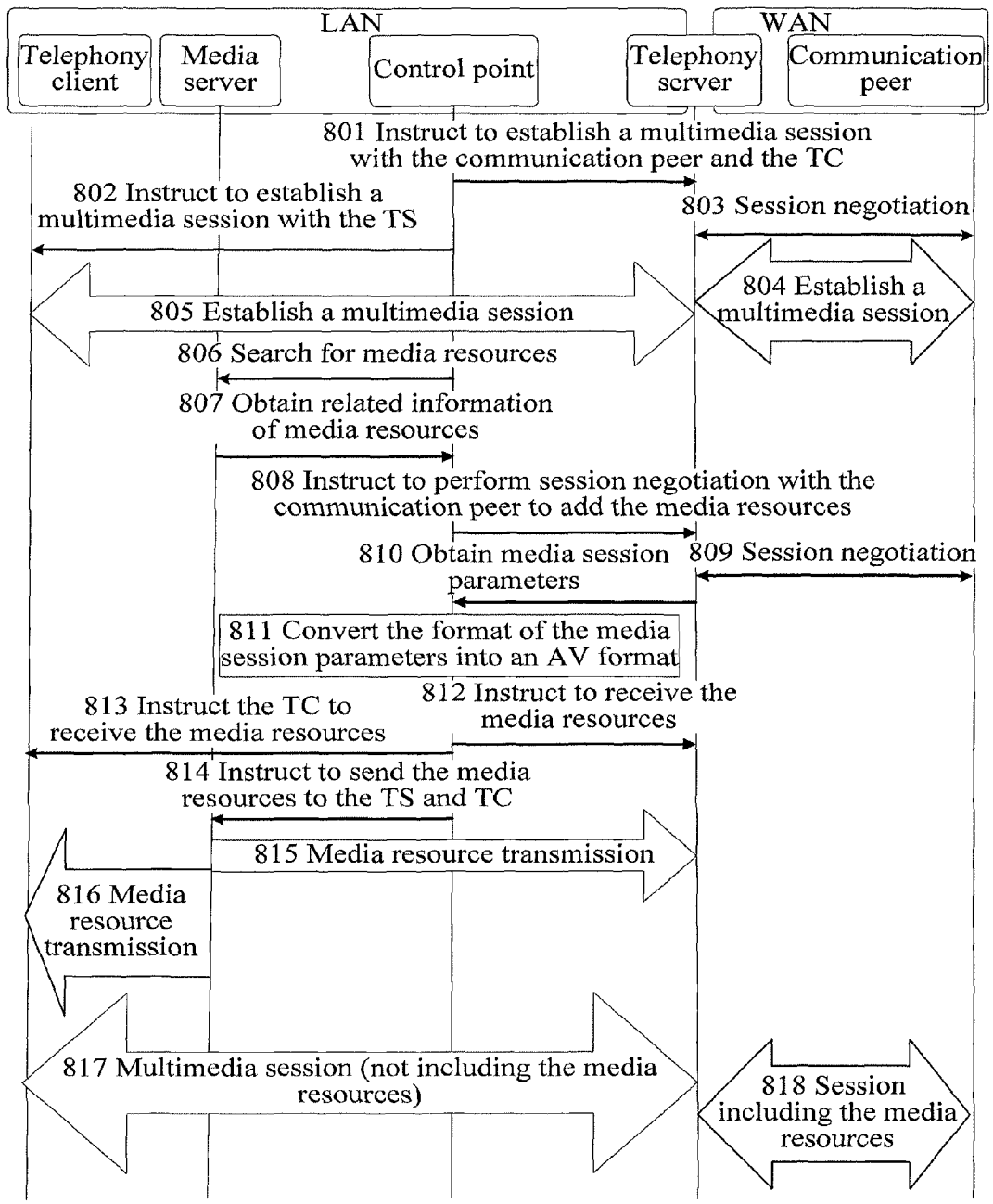
FIG. 8 is a flow chart of a method according to Embodiment 8 of the present invention.

As shown in FIG. 8, the method includes the following steps:

Steps 801-807 are the same as steps 701-707, which are not described in detail herein again.

808: The CP sends an instruction message to the TS and instructs the TS to perform session negotiation with the WAN side communication peer to add the media resources, where the instruction message includes the related information of the media resources.

Steps 809-811 are the same as steps 709-711, which are not described in detail herein again.

812: The CP instructs the TS to prepare to receive media resources.

813: The CP instructs the TC to prepare to receive media resources.

814: The CP instructs the MS to send selected media resources to the TS and TC according to the media session parameters.

815: The MS sends the media resources to the TS.

816: The MS sends the media resources to the TC.

817: The TS performs a multimedia session with the TC, where the multimedia session does not include the media resources.

818: The TS sends the media resources to the WAN side communication peer through the multimedia session between the TS and the WAN side communication peer.

In the method for transmitting media resources according to the embodiment of the present invention, a CP searches an MS for media resources according to a requirement of a TS, sends an instruction message carrying related information of the media resources to the TS, instructs the TS to perform session negotiation with a communication peer, determines information of a communication interface used by the TS to receive the media resources, sends an instruction message carrying the information of the communication interface to the MS, and instructs the MS to send the media resources to the TS and TC. Compared with the prior art, through the extension of the UPnP AV standard, and protocol comprehension and format conversion of transmission parameters between the TS and MS, a media session channel is established between the MS and TS, so that the MS can support direct sending of the RTP/UDP media resources to the TS. The TS may obtain the media resources from the MS without any improvement. In addition, the TC may also obtain media resources from the MS, so that the implementation is simple.

Embodiment 9

An embodiment provides a method for transmitting media resources. In this embodiment, a CP first instructs a TS to perform session negotiation with a WAN side communication peer to add media resources, and then establishes media resource transmission between an MS and the TS. The MS sends the media resources to the TS through HTTP (Hyper Text Transfer Protocol, hyper text transfer protocol)/TCP (Transmission Control Protocol, transmission control protocol).

In this embodiment, the CP converts media resource information (mainly the URL) obtained from the MS into SDP information. The TS proactively establishes a connection (by sending an HTTP GET request) with the MS according to the SDP information and obtains media resources.

Figure 9:
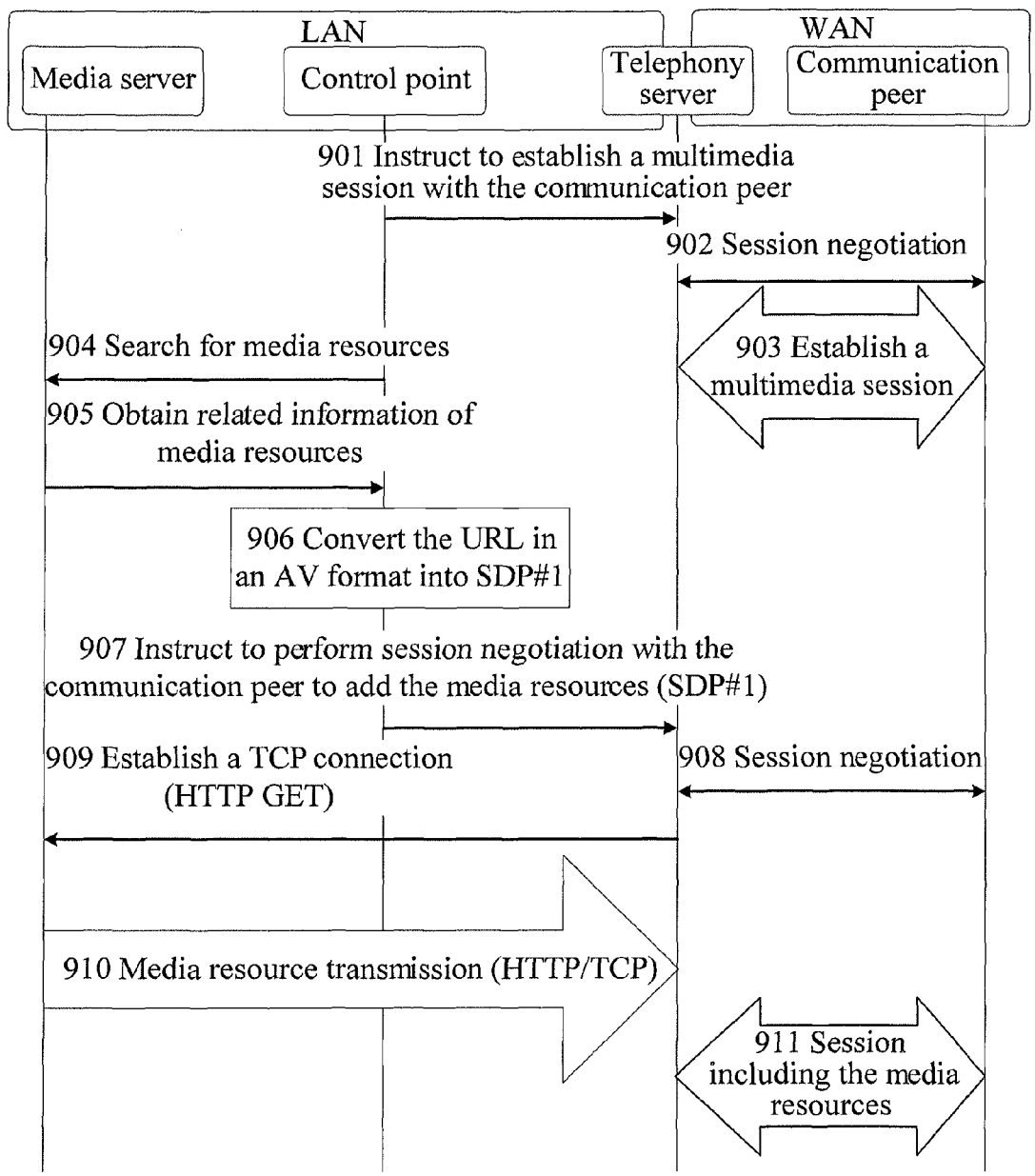
FIG. 9 is a flow chart of a method according to Embodiment 9 of the present invention.

As shown in FIG. 9, the method includes the following steps:

Steps 901-905 are the same as steps 301-305, which are not described in detail herein again.

906: The CP converts the URL in an AV format in the obtained media resource information into the information SDP#1 in a format supported by the TS.

The URL generally points to a local MS, but may also point to addresses on other devices or networks. That is, the related information of the media resources may be stored on a media server 1, while actual media resources are stored on a media server 2. In this case, the URL of the media resource on the media server may point to the media server 2, and the TS obtains the media resource from the media server 2.

907: The CP sends an instruction message to the TS and instructs the TS to perform session negotiation with the WAN side communication peer to add the media resources, where the instruction message includes SDP#1.

908: The TS performs session negotiation with the WAN side communication peer to add the media resources, and the multimedia session is established successfully.

909: The TS sends an HTTP GET message to the MS according to an address designated by the URL, and establishes a TCP connection with the MS.

910: The MS sends the media resources to the TS through the HTTP/TCP protocol.

911: The TS sends the received media resources to the WAN side communication peer through the established multimedia session.

Certainly, the CP may also send the related information of the media resources to the TS first, and command the TS to establish a multimedia session with the WAN side communication peer. After establishing the multimedia session with the WAN side communication peer, the TS sends SDP information to the CP. The CP translates the URL of the media resources into the SDP and sends it to the TS, and instructs the TS to start obtaining the media resources through the HTTP GET request.

In the method according to the embodiment of the present invention, a CP searches an MS for media resources according to a requirement of a TS, sends an instruction message carrying related information of the media resources, and instructs the TS to perform session negotiation with the communication peer to add the media resources. The TS proactively establishes a connection with the MS according to the URL of the media resource and obtains the media resource. Compared with the prior art, the TS may obtain media resources from the MS without any improvement, and send the media resources to the communication peer, so that the implementation is simple.

Embodiment 10

An embodiment provides a method for transmitting media resources. Different from Embodiment 1, media resource transmission is established between a telephony server and a media server first, and at the same time (or later), the telephony server is commanded to establish or modify a multimedia session with a communication peer, and send media resources from the media server to the communication peer.

Figure 10:
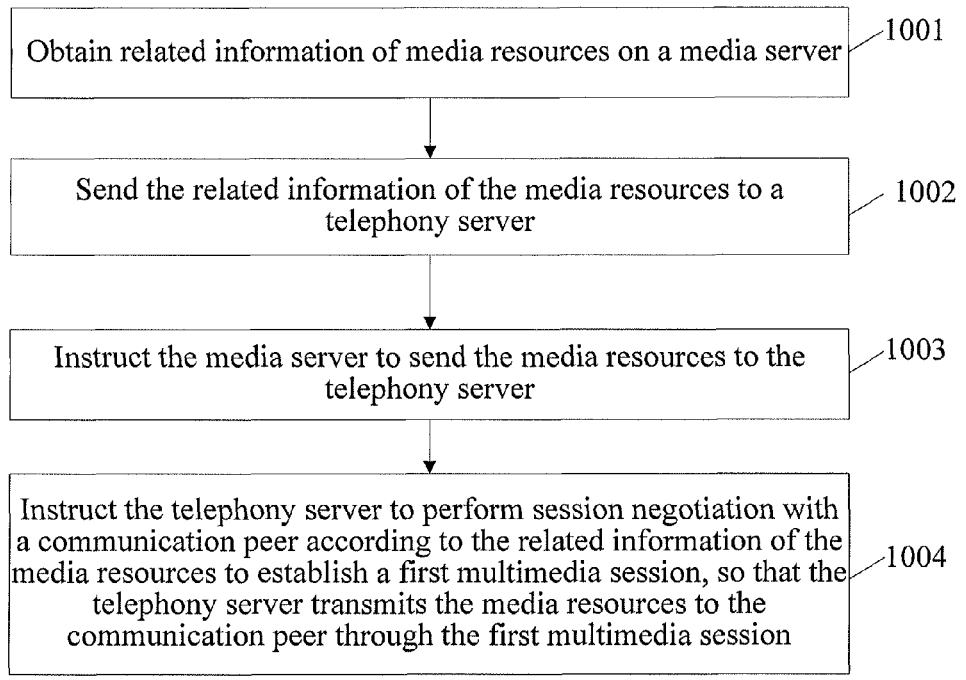
FIG. 10 is a flow chart of a method according to Embodiment 10 of the present invention.

As shown in FIG. 10, the method includes the following steps:

1001: Obtain related information of media resources on a media server.

1002: Send the related information of the media resources to a telephony server.

1003: Instruct the media server to send the media resources to the telephony server.

1004: Instruct the telephony server to perform session negotiation with a communication peer according to the related information of the media resources to establish a first multimedia session, so that the telephony server transmits the media resources to the communication peer through the first multimedia session.

The method process described in this embodiment is also applicable to Embodiment 3 to Embodiment 8. For the specific implementation method, references may be made to the above embodiments.

In the method for transmitting media resources according to the embodiment of the present invention, related information of media resources obtained from a media server is sent to a telephony server. First, the media server is instructed to send the media resources to the telephony server, and then the telephony server is instructed to perform session negotiation with a communication peer according to the related information of the media resources to establish a first multimedia session to transmit the media resources. Compared with the prior art, the embodiment of the present invention can establish a media session channel between the media server and the telephony server. The telephony server may obtain media resources from the media server without any improvement, so that the implementation is simple.

Embodiment 11

Figure 11:
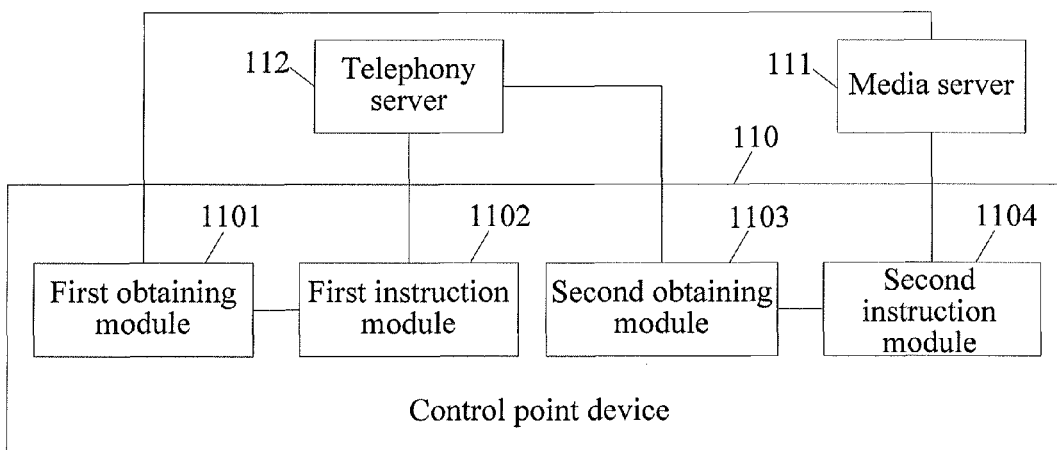
FIG. 11 and FIG. 12 are schematic structural diagrams of a control point device according to Embodiment 11 of the present invention.

An embodiment provides a control point device. As shown in FIG. 11, the control point device 110 includes:

a first obtaining module 1101, configured to obtain related information of media resources on a media server 111;

a first instruction module 1102, configured to send an instruction message including the related information of the media resources to a telephony server 112, wherein the instruction message instructs the telephony server 112 to perform session negotiation with a communication peer according to the related information of the media resources to establish a first multimedia session;

a second obtaining module 1103, configured to obtain information of a communication interface used by the telephony server 112 to receive the media resources; and a second instruction module 1104, configured to send the instruction message according to the information of the communication interface, wherein the instruction message instructs the media server 111 to send the media resources to the telephony server 112, so that the telephony server 112 transmits the media resources to the communication peer through the first multimedia session.

The second instruction module 1104 is specifically configured to send an instruction message carrying the information of the communication interface to the media server 111, wherein the instruction message instructs the media server 111 to send the media resources to the telephony server 112 according to the information of the communication interface;

or specifically configured to send an instruction message to the telephony server 112, wherein the instruction message instructs the telephony server 112 to establish a session with the media server 111, so that the media server 111 sends the media resources to the telephony server 112 through the session.

Figure 12:
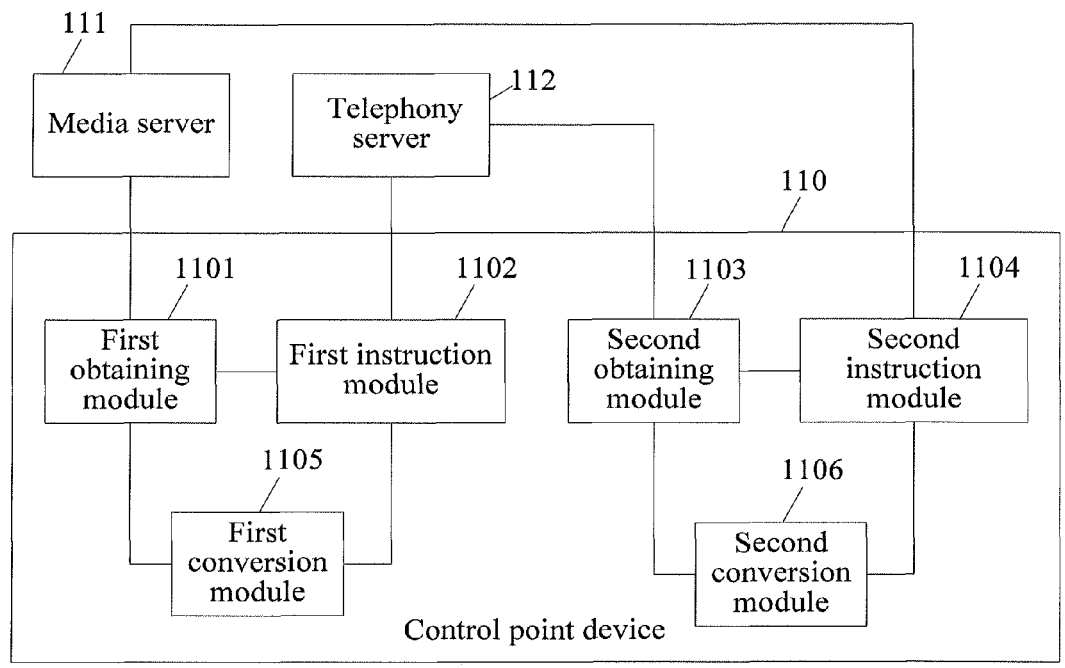

Further, as shown in FIG. 12, the control point device 110 may further include:

a first conversion module 1105, configured to convert the related information of the media resources into a format supported by the telephony server 112;

where the first instruction module 1102 is specifically configured to send, to the telephony server 112, instruction information including the related information of the media resources on which the first conversion module 1105 has performed.

Further, as shown in FIG. 12, the control point device 110 may further include:

a second conversion module 1106, configured to convert the information of the communication interface into a format supported by the media server 111;

where the second instruction module 1104 is specifically configured to send an instruction message according to the information of the communication interface converted by the second conversion module 1106, wherein the instruction message instructs the media server 111 to send the media resources to the telephony server 112.

Further, the first instruction module 1102 is further configured to send an instruction message to the telephony server 112, wherein the instruction message instructs the telephony server 112 to receive the media resources.

Further, the first instruction module 1102 is further configured to instruct the telephony server 112 to establish a second multimedia session with a telephony client; and instruct the telephony server 112 to send the media resource received from the media server 111 to the telephony client through the second multimedia session.

Further, the second instruction module 1104 is further configured to instruct the media server 111 to establish a multimedia transmission session with the telephony client; and instruct the media server 111 to send the media resources to the telephony client.

The control point device according to the embodiment of the present invention sends an instruction message including related information of media resources to a telephony server, wherein the instruction message instructs the telephony server to perform session negotiation with a communication peer, determines the information of the communication interface used by the telephony server to receive the media resource, sends an instruction message carrying the information of the communication interface to the media server, wherein the instruction message instructs the media server to send the media resource to the telephony server. Compared with the prior art, through the protocol comprehension and format conversion of transmission parameters between the telephony server and the media server, a media session channel is established between the media server and the telephony server. The telephony server may obtain media resources from the media server without any improvement, and send the media resources to the communication peer, so that the implementation is simple.

Embodiment 12

Figure 13:
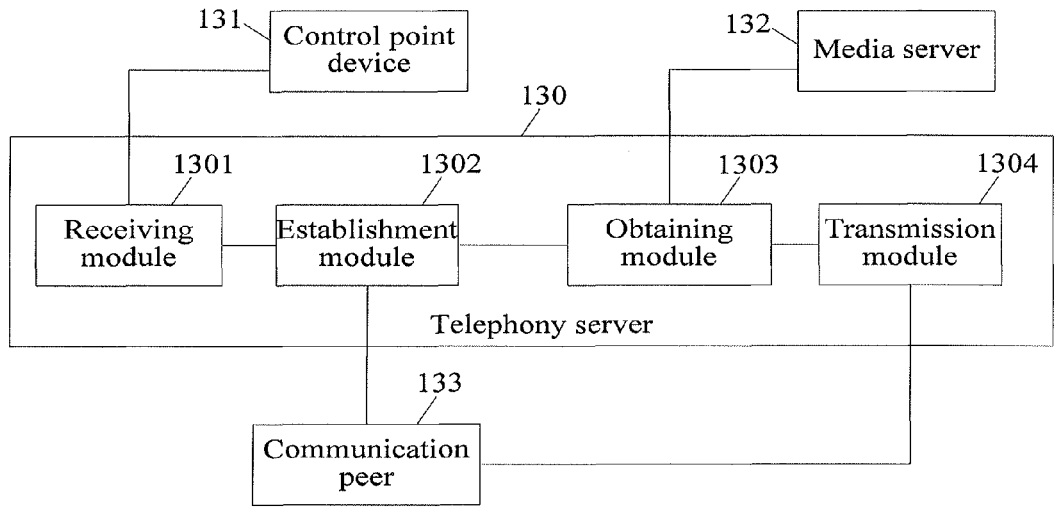
FIG. 13, FIG. 14 and FIG. 15 are schematic structural diagrams of a telephony server according to Embodiment 12 of the present invention.

An embodiment provides a telephony server. As shown in FIG. 13, the telephony server 130 includes:

a receiving module 1301, configured to receive a first instruction message from a control point device 131, where the first instruction message carries related information of media resources on a media server 132;

an establishment module 1302, configured to perform session negotiation with a communication peer 133 according to the first instruction message to establish a first multimedia session;

an obtaining module 1303, configured to obtain the media resources from the media server 132; and a transmission module 1304, configured to transmit the media resources to the communication peer 133 through the first multimedia session.

Figure 14:
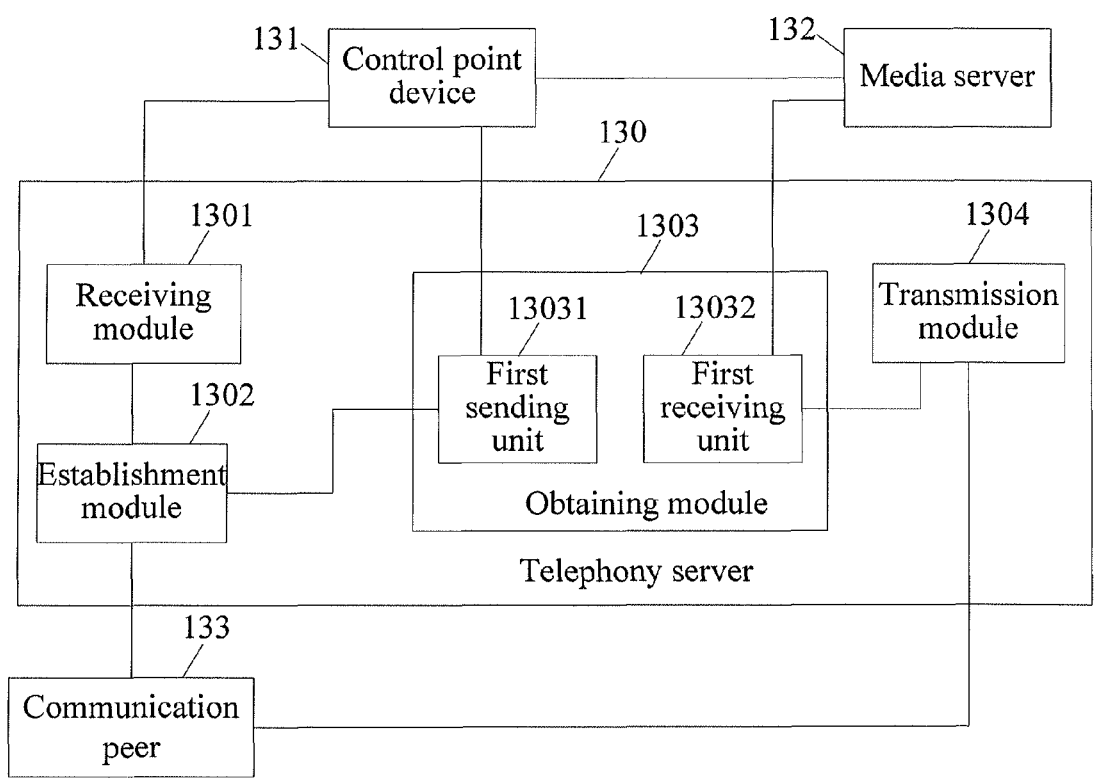

Further, as shown in FIG. 14, the obtaining module 1303 may include:

a first sending unit 13031, configured to send information of a communication interface for receiving the media resources to the control point device 131, so that the control point device 131 sends a second instruction message to the media server 132 according to the information of the communication interface; and a first receiving unit 13032, configured to receive, over the communication interface, the media resources sent by the media server 132 according to the second instruction message.

Figure 15:
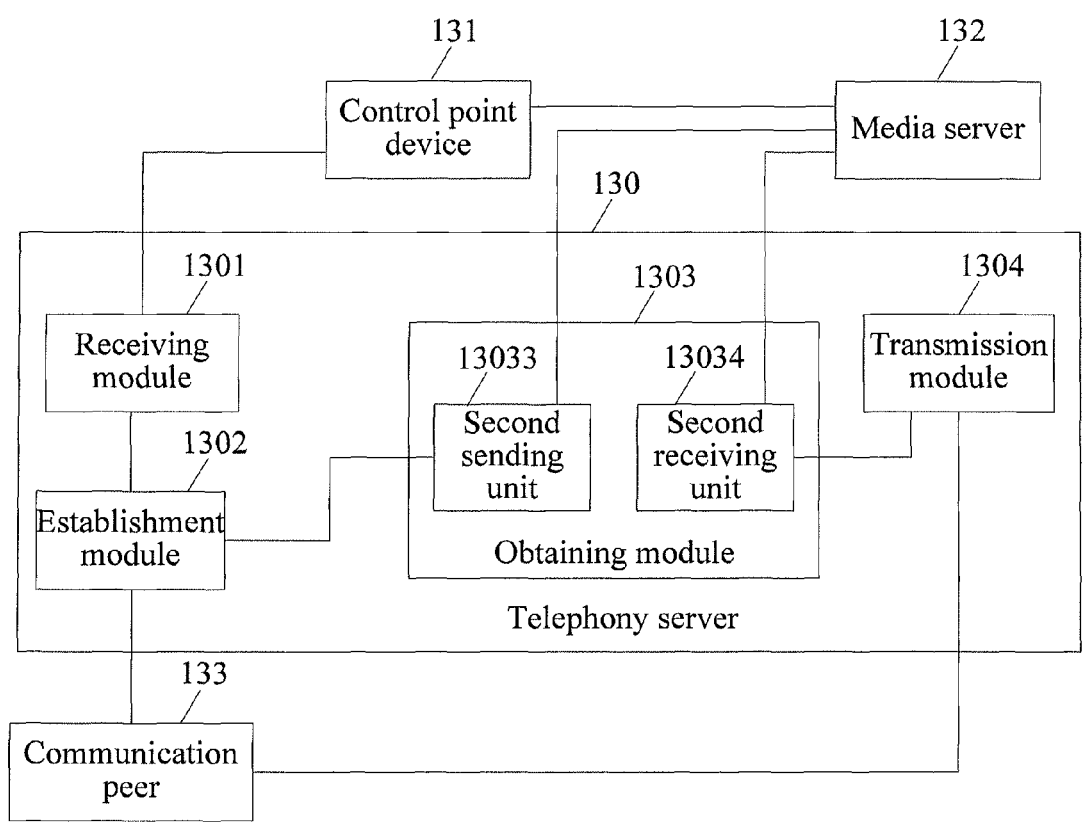

Further, as shown in FIG. 15, the obtaining module 1303 may include:

a second sending unit 13033, configured to send a request message to the media server 132 to request the media resources; and a second receiving unit 13034, configured to receive the media resources sent by the media server 132 according to the request message.

In the telephony server according to the embodiment of the present invention, the telephony server receives a first instruction message carrying related information of media resources on a media server, performs session negotiation with a communication peer according to the instruction message to establish a first multimedia session, and transmits the media resources obtained from the media server to the communication peer through the first multimedia session. Compared with the prior art, the telephony server may obtain media resources from the media server without any improvement, and send the media resources to the communication peer, so that the implementation is simple.

The control point device and the telephony server according to the embodiments of the present invention can implement the above method embodiments. The method and apparatus for transmitting media resources according to the embodiments of the present invention are applicable to multimedia sessions, but are not limited thereto.

Persons of ordinary skill in the art should understand that all or a part of the processes of the method according to the embodiments of the present invention may be implemented by a program instructing relevant hardware. The program may be stored in a computer readable storage medium. When the program is run, the processes of the method according to the embodiments of the present invention are performed. The storage medium may be a magnetic disk, an optical disk, a Read-Only Memory (Read-Only Memory, ROM) or a Random Access Memory (Random Access Memory, RAM).

The above is only the specific implementation of the present invention, but the protection scope of the present invention is not limited thereto. Any change or replacement that can be easily thought of by persons skilled in the art within the technical scope disclosed by the present invention shall fall within the protection scope of the present invention. Therefore, the protection scope of the present invention shall be subject to the protection scope of the claims.

What is claimed is:

1. A method for transmitting media resources, comprising:
a control point device, a media server and a telephony server, each of which being separate and different network devices communicating to each other within a same local network, the method comprising:
obtaining by the control point device, related information of media resources received from the media server;
sending by the control point device, a first instruction message comprising the related information of the media resources to the telephony server, wherein the first instruction message instructs the telephony server to perform session negotiation with a remote communication peer, which does not belong to the same local network according to the related information of the media resources to establish a first multimedia session;
the control point device obtaining from the telephony server, information of a communication interface used by the telephony server to receive the media resources from the media server; and
sending by the control point device, a second instruction message to the telephony server according to the obtained information of the communication interface used by the telephony server, wherein the second instruction message instructs the telephony server to obtain the media resources from the media server to enable the telephony server to start transmitting the media resources to the remote communication peer through the first established multimedia session.

2. The method according to claim 1, wherein the sending of the second instruction message according to the obtained information of the communication interface that instructs the media server to send the media resources to the telephony server, comprising:
sending by the control point device, the second instruction message which carries the obtained information of the communication interface used by the telephony server to the media server, wherein the second instruction message instructs the media server to send the media resources to the telephony server according to the obtained information of the communication interface.

3. The method according to claim 1, wherein the sending of the second instruction message according to the information of the communication interface that instructs the media server to send the media resources to the telephony server, comprising:
sending by the control point device, a third instruction message to the telephony server, wherein the third instruction message instructs the telephony server to establish a second session with the media server to enable the media server to start sending the media resources to the telephony server through the second established session.

4. The method according to claim 1, wherein before the sending of the first instruction message carrying the related information of the media resources to the telephony server, the method further comprising:
converting by the control point device, the related information of the media resources into a format supported by the telephony server.

5. The method according to claim 1, wherein before the sending of the second instruction message according to the obtained information of the communication interface to the media server, the method further comprising:
converting by the control point device, the obtained information of the communication interface into a format supported by the media server.

6. The method according to claim 1, further comprising:
sending a third instruction message to the telephony server, wherein the third instruction message instructs the telephony server to receive the media resources.

7. The method according to claim 1, wherein the obtaining from the telephony server, the information of the communication interface used by the telephony server to receive the media resources comprising:
receiving by the control point device, a unicast or multicast event carrying the information of the communication interface sent by the telephony server;
or
sending by the control point device, a command for obtaining the information of the communication interface to the telephony server, and receiving a response message carrying the information of the communication interface returned by the telephony server.

8. The method according to claim 1, further comprising:
instructing by the control point device, the telephony server to establish a third multimedia session with a telephony client; and
instructing by the control point device, the telephony server to send the media resources received from the media server to the telephony client through the third multimedia session.

9. The method according to claim 1, further comprising:
instructing by the control point device, the media server to establish a media transmission session with a telephony client; and
instructing by the control point device, the media server to send the media resources to the telephony client.

10. A method for transmitting media resources, comprising:
a control point device, a media server and a telephony server, each of which being separate and different network devices communicating to each other within a same local network, the method comprising:
receiving by the telephony server, a first instruction message from the control point device, wherein the first instruction message carries related information of media resources received from the media server;
performing by the telephony server, session negotiation with a remote communication peer, which does not belong to the same local network according to the first instruction message to establish a first multimedia session between the telephony server and the remote communication peer;
obtaining by the telephony server, the media resources from the media server; and
transmitting by the telephony server, the media resources to the remote communication peer through the first multimedia session.

11. The method according to claim 10, wherein the obtaining the media resources from the media server comprising:
sending by the telephony server, information of a communication interface for receiving the media resources to the control point device to enable the control point device to start sending a second instruction message to the media server according to the information of the communication interface; and
receiving by the telephony server, over the communication interface, the media resources sent by the media server according to the second instruction message.

12. The method according to claim 10, wherein the obtaining of the media resources from the media server comprising:
sending by the telephony server, a request message to the media server to request obtaining the media resources; and
receiving by the telephony server, the media resources sent by the media server according to the request message.

13. The method according to claim 10, wherein the related information of the media resources is obtained by the control point device from the media server and converted by the control point device into a format supported by the telephony server.

14. A control point device, comprising:
at least a program instructing relevant hardware executing program codes stored in a non-transitory computer readable medium which cause the control point device to perform functions as a plurality of modules or units, wherein the plurality of modules or units comprise:
a first obtaining module, configured to obtain related information of media resources received from a media server;
a first instruction module, configured to send a first instruction message comprising the related information of the media resources to a telephony server, wherein each of the telephony server, the control point device and the media server being separate and different network devices communicating to each other within a same local network, wherein the first instruction message instructs the telephony server to perform session negotiation with a remote communication peer, which does not belong to the same local network according to the related information of the media resources to establish a first multimedia session;

a second obtaining module, configured to obtain from the telephony server, information of a communication interface used by the telephony server to receive the media resources; and the second obtaining module, configured to send a second instruction message to the telephony server according to the obtained information of the communication interface used by the telephony server, wherein the second instruction message instructs the media server to send the media resources to the telephony server to enable the telephony server to start transmitting the media resources to the remote communication peer through the first established multimedia session.

15. The control point device according to claim 14, wherein the second instruction module is specifically configured to send the second instruction message which carries the obtained information of the communication interface used by the telephony server to the media server, wherein the second instruction message instructs the media server to send the media resources to the telephony server according to the obtained information of the communication interface.

16. The control point device according to claim 14, wherein the second instruction module is specifically configured to send a third instruction message to the telephony server, wherein the third instruction message instructs the telephony server to establish a second session with the media server to enable the media server to start sending the media resources to the telephony server through the second established session.

17. The control point device according to claim 14, further comprising:

a first conversion module, configured to convert the related information of the media resources into a format supported by the telephony server;

wherein the first instruction module is specifically configured to send to the telephony server, the first instruction information comprising the related information of the media resources on which the first conversion module has performed format conversion.

18. The control point device according to claim 14, further comprising:

a second conversion module, configured to convert the obtained information of the communication interface into a format supported by the media server;

wherein the second instruction module is specifically configured to send the second instruction message according to the obtained information of the communication interface after conversion by the second conversion module, wherein the second instruction message instructs the media server to send the media resources to the telephony server.

19. The control point device according to claim 14, wherein the first instruction module is further configured to send a third instruction message to the telephony server, wherein the third instruction message instructs the telephony server to receive the media resources.

20. The control point device according to claim 14, wherein the first instruction module is further configured to instruct the telephony server to establish a second multimedia session with a telephony client; and instruct the telephony server to send the media resource received from the media server to the telephony client through the second multimedia session.

21. The control point device according to claim 14, wherein the second instruction module is further configured to instruct the media server to establish a third media transmission session with a telephony client; and instruct the media server to send the media resources to the telephony client.

22. A telephony server, comprising at least a program instructing relevant hardware executing program codes stored in a non-transitory computer readable medium which cause the telephony server to perform functions as a plurality of modules or units, wherein the plurality of modules or units comprise:

a receiving module, configured to receive a first instruction message from a control point device, wherein the first instruction message carries related information of media resources received from a media server, wherein each of the telephony server, the control point device and the media server being separate and different network devices communicating to each other within a same local network;

an establishment module, configured to perform session negotiation with a remote communication peer, which does not belong to the same local network according to the first instruction message to establish a first multimedia session;

an obtaining module, configured to obtain the media resources from the media server; and a transmission module, configured to transmit the media resources to the remote communication peer through the first multimedia session.

23. The telephony server according to claim 22, wherein the obtaining module comprises:

a first sending unit, configured to send information of a communication interface for receiving the media resources to the control point device, so that the control point device sends a second instruction message to the media server according to the information of the communication interface; and a first receiving unit, configured to receive, over the communication interface, the media resources sent by the media server according to the second instruction message.

24. The telephony server according to claim 22, wherein the obtaining module comprises:

a second sending unit, configured to send a request message to the media server to request to obtain the media resources; and a second receiving unit, configured to receive the media resources sent by the media server according to the request message.

* * * * *